July 8, 1941.　　　J. KRONHEIM ET AL　　　2,248,093
SPRING SEAT STRUCTURE FOR AUTOMOBILES
Filed June 24, 1938　　　4 Sheets-Sheet 1

INVENTOR.
JACOB KRONHEIM
WILLIAM H. NEELY
BY
ATTORNEY.

July 8, 1941.  J. KRONHEIM ET AL  2,248,093
SPRING SEAT STRUCTURE FOR AUTOMOBILES
Filed June 24, 1938  4 Sheets-Sheet 2
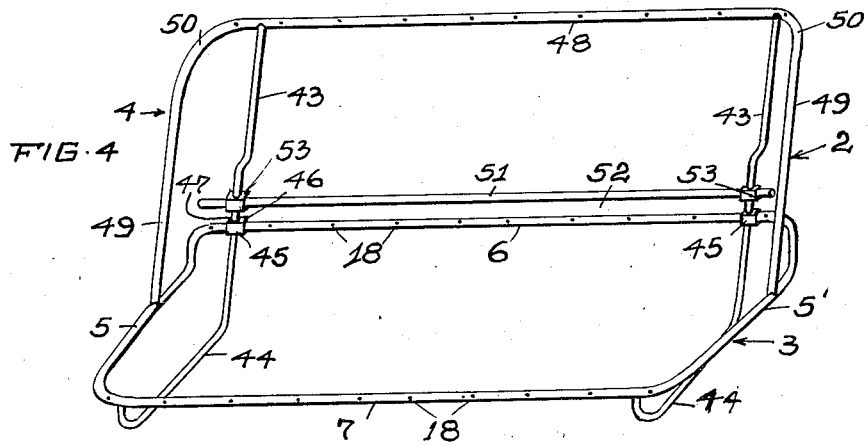
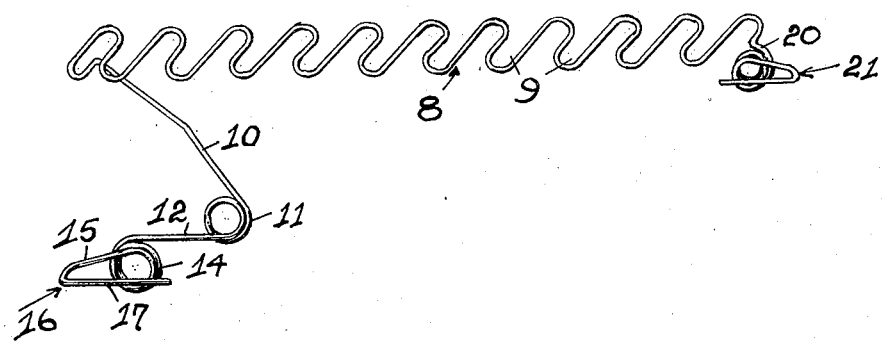
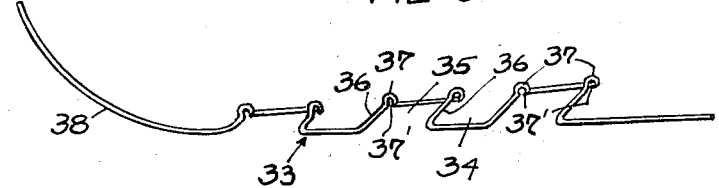
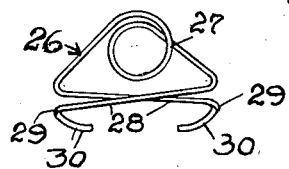
INVENTOR.
JACOB KRONHEIM
WILLIAM H. NEELY
BY
ATTORNEY.

July 8, 1941.  J. KRONHEIM ET AL  2,248,093
SPRING SEAT STRUCTURE FOR AUTOMOBILES
Filed June 24, 1938  4 Sheets-Sheet 3
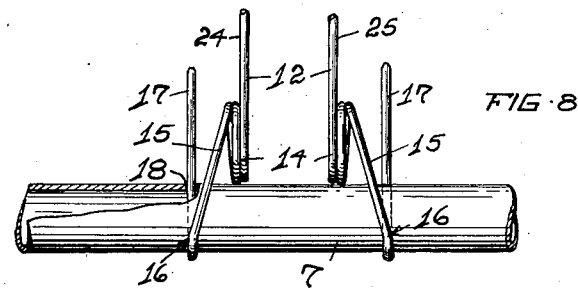
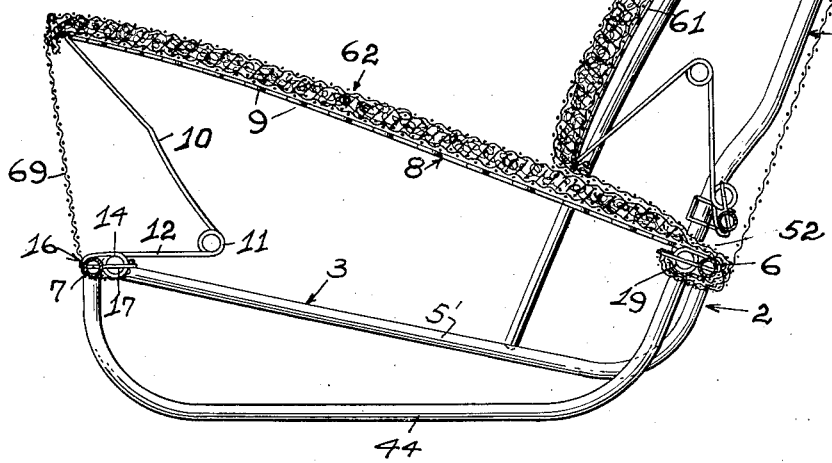
INVENTOR.
JACOB KRONHEIM
WILLIAM H. NEELY
BY Gustav A. Wolff
ATTORNEY.

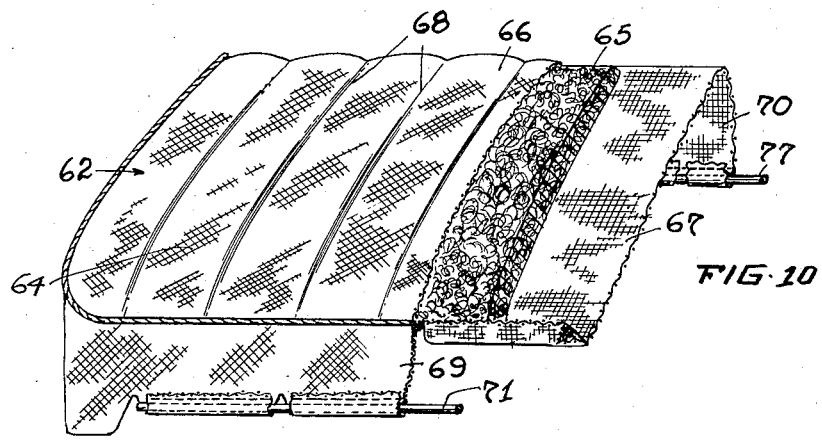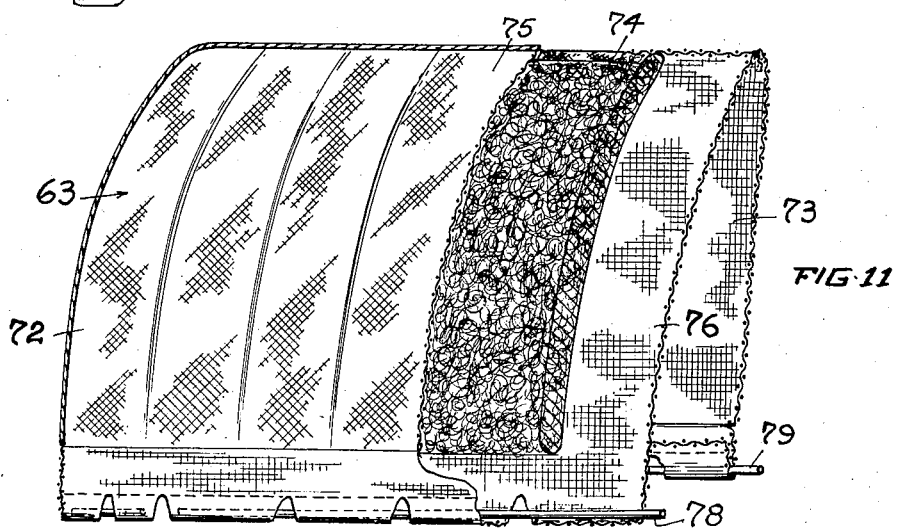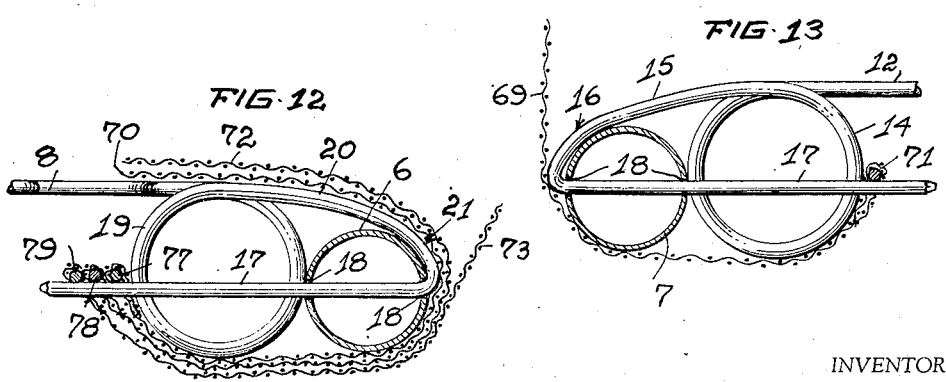

Patented July 8, 1941

2,248,093

UNITED STATES PATENT OFFICE 2,248,093

SPRING SEAT STRUCTURE FOR AUTOMOBILES

Jacob Kronheim, Cleveland Heights, and William H. Neely, Cleveland, Ohio, assignors, by direct and mesne assignments, to John C. Lincoln, Scottsdale, Ariz.

Application June 24, 1938, Serial No. 215,526

32 Claims. (Cl. 155—179)

This invention relates in general to springs and spring seat structures for upholstered furniture and more particularly to unitary spring seat structures specifically adapted to be used in moving vehicles, such as automobiles, railroad cars, etc. Spring seat structures of this type generally embody a combined seat and back frame and box-like spring assemblies of helical springs removably supported by the frame or rigidly secured with their bottom portions to the frame. In all these constructions the top portions of the box-like spring assemblies extend a substantial distance above the frame, therefore these constructions have the tendency to sway when vehicles equipped with this type of seat construction travel through curves. In addition, constructions of the described type rebound vertically and often interfere with proper operation of a moving vehicle when driven over a bumpy road.

It is the primary object of the present invention to provide a spring seat structure which eliminates undesirable swaying and vertical rebounding actions by the use of interconnected corrugated specific wire springs, each of which has its opposite ends rigidly secured to a frame and each of which consists of a substantially straight seating or resting portion, an integral rearwardly and downwardly inclined supporting front arm and an integral coiled portion at the rear end of the seating portion.

Another object of the present invention is to provide a spring seat structure embodying a tubular unitary frame having a seat portion and a back portion, and a plurality of elongated wire springs with corrugated seating portions, which springs bridge said seat and back portions, and include means for rigidly attaching the springs to the tubular frame.

A further object of the invention is the provision of an automobile seat structure embodying a tubular frame with seat and back portions, which frame mounts a plurality of elongated wire springs bridging said frame, each of the springs being at its opposite ends secured to the frame and, in addition, the outer springs in the seat portion supporting and being interlocked with specific lateral extensions effecting a stiffening of these springs and permitting of the spring assembly being shaped in any desired manner at its side edges.

Still another object of the invention is the provision of an automobile seat structure embodying a frame with seat and back portions and a plurality of elongated corrugated wire springs symmetrically arranged crosswise of the seat and back portions of the frame, which springs each include end coils contacting said frame and are formed with attachment means laterally offset with respect to the axis of the spring to effect proper mounting of the spring in the frame and contact of their end coils with the frame in alignment with the axes of said springs.

A still further object of the invention is the provision of an automobile seat structure embodying a frame with seat and back portions, a plurality of elongated corrugated wire springs of specific construction bridging the seat and back portions of the frame and forming seat and back spring assemblies therewith, and combined covering and padding means sleeved upon the spring assemblies and jointly secured thereto.

In addition, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings, forming part of the specification.

In the drawings:

Fig. 4 is a perspective view of the frame structure without the springs.

Fig. 5 is a perspective view of one of the springs used in the seat structure.

Fig. 6 is a perspective view of one of the corrugated extension members used at opposite ends of the seating portion of the seat structure.

Fig. 7 is a view of one of the tensioning spring members used in the seating and back portions of the spring assemblies of the seat structure.

Fig. 8 is a fragmentary plan view partly in section showing interlocking of a left-handed and a right-handed spring with the front rail of the frame structure.

Fig. 9 is a vertical sectional view through an automobile seat structure according to the invention fully assembled and covered with padded covering.

Fig. 10 is a perspective view, partly broken away, of the finished seat covering before its attachment to the seat portion of the seat structure.

Fig. 11 is a perspective view partly broken away of the finished back covering before its attachment to the back portion of the seat structure.

Figure 1:
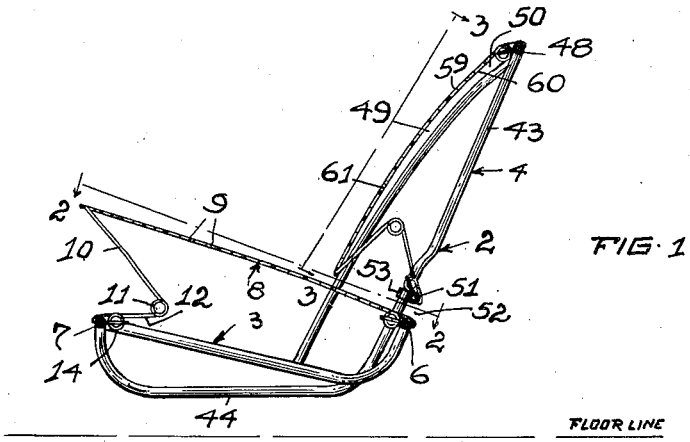
Fig. 1 is a vertical sectional view through an automobile seat structure according to the invention, showing the frame structure and spring assembly, when the padded covering is removed.
Figure 2:
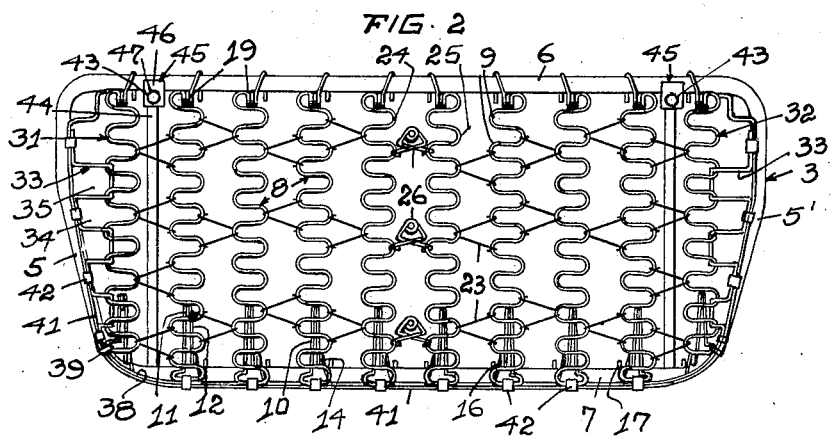
Fig. 2 is a sectional view on line 2—2 of Fig. 1, showing the spring assembly in the seating portion of the seat structure.
Figure 3:
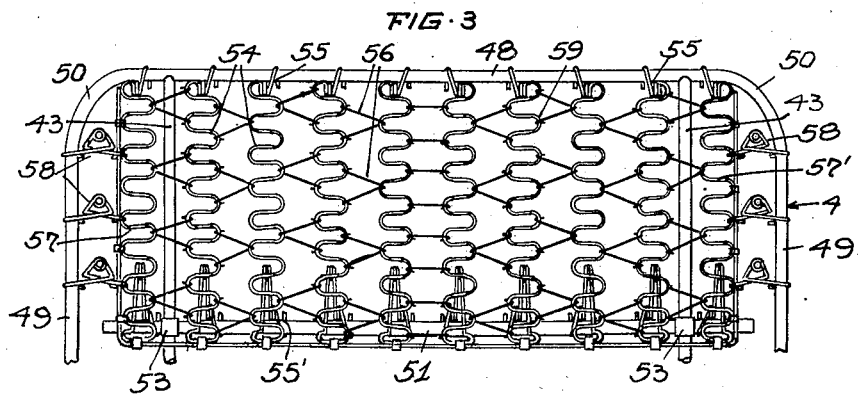
Fig. 3 is a sectional view on line 3—3 of Fig. 1, showing the spring assembly of the back portion of the seat structure.

Fig. 12 is an enlarged fragmentary sectional view showing the fastening of the padded covering of the seating and back structure to the hook-shaped rear ends of the springs mounted in the seating portion; and Fig. 13 is an enlarged fragmentary sectional view showing the fastening of the padded covering of the seating portion to the hook-shaped front ends of the springs mounted in the seating portion.

Referring now in detail to the exemplified form of the seat structure shown in the drawings, reference numeral 2 indicates a tubular frame structure embodying a seat frame portion 3 and a back frame portion 4. Seat frame portion 3, a substantially rectangularly shaped open frame structure, is made of tubular piping and has its side rails 5, 5' bent upwardly, so that the rear rail 6 is in elevated position with respect to a plane through the front rail 7 and the front portions of side rails 5, 5', an arrangement permitting ample space for a yielding action of elongated corrugated wire springs 8, which springs bridge the frame portion 3 crosswise and are secured to the front and rear rails 7 and 6 in a manner hereinafter to be described.

Springs 8 are made of steel wire, bent to sinuous shape, so that their loops 9 extend substantially parallel to each other and permit longitudinal yielding stretching of the springs under load. The front end of each spring is formed with an integral, rearwardly and downwardly extended supporting arm 10, which is looped at its lower end to provide a spring coil 11 arranged in a plane substantially rectangular to the plane of the spring. The end of coil 11 extends straight forward as at 12 from the bottom of said coil and is then looped in opposite direction with respect to coil 11 to form a second coil 14, which coil is downwardly extended from straight portion 12 in a plane also substantially rectangular to the plane of the spring. The coil 14 has a free straight end portion 15 which is extended from the top of the coil forwardly and laterally at an acute angle with respect to the axis of the spring, and this portion 15 is doubled back in definite spaced relation with respect to said coil to form a hook-shaped means 16 adapted to rigidly secure the spring to front rail 7, as will be later described. The double-back portion 17 extends substantially straight backward slightly beyond coil 14 to facilitate passing of said portion through holes 18 in the front rail 7 and proper fastening of a covering, as will be later described. Straight portion 15 is dimensioned to effect yielding contact of coil 14 with front rail 7 when doubled-back portion 17 is fully extended into and partly through holes 18 and the spring has been tilted upwardly so that coil 14 is rectangularly related to said rail. The described hook-shaped formation and coil 14 effect a simple sturdy and readily releasable coupling between the spring and the perforated rail, there being formed a laterally offset three point support for the spring. At the rear each spring is formed with coil 19, which coil extends rearwardly and downwardly and is arranged in a plane substantially rectangular to the plane of the spring. This latter coil has a straight free end portion 20, which is extended from the top of the coil rearwardly and laterally at an acute angle with respect to the axis of the spring and which is doubled-back in definite spaced relation with respect to said coil in a manner similar to the end portion 15 of coil 14. This construction forms a hook-shaped means 21 at the rear end of the spring and permits of said rear end being rigidly secured to the perforated rear rail 6 in a manner similar to the previously described coupling between hook-shaped means 16 and front rail 7. Further description of such coupling is therefore deemed to be superfluous.

The frame portion 3 is bridged by an even number of springs 8, which springs are symmetrically distributed over the frame and hingedly coupled with each other by V-shaped wire hooks 23. In addition, the springs 8 are constructed as left-handed and right-handed springs. Thus the hook-shaped means 16 and 21 of the springs arranged in the left half of the frame portion are laterally offset to one side and the hook-shaped means of the springs arranged in the right frame portion are laterally offset to the opposite side, so as to effect proper balance of the assembled spring structure. The two center springs 24 and 25 of the assembled spring structure are coupled with each other by means of a plurality of yielding flat spring members 26, each of which is made of spring steel wire bent to substantially triangular shape. These spring members are each provided at their top with a coil 27 and their base is formed by overlapping straight portions 28, the ends 29 of which are bent to hooks 30. These hooks 30 are engaged with the loops 9 of the springs and consequently spring members 26 draw the hingedly connected springs of the left frame portion and the springs of the right frame portion yieldingly toward each other. In addition, spring members 26 serve to support the padded covering between springs 24 and 25.

The outer springs 31 and 32 of the thus formed seat spring assembly each support and are coupled with elongated lateral extension members 33 made of spring steel wire. Each of these members is formed by bending a wire to alternately changing left- and right-handed loops 34, 35 of substantially rectangular outline, which loops, as shown, decrease in depth toward the front portion of the member 33 to effect an inward slant of the side edge of the assembled spring structure. The loops 35, arranged adjacent to springs 31 and 32, are seized to permit of said loops being readily hooked over and engaged with each second loop 9 of the springs 31, 32, a connection which prohibits pivotal downward movement of said extension members with respect to said springs. Preferably, as shown, the loops 35 have in their parallel sides 36, 36' struck-up portions 37 which form recessed seats 37' for the wire of springs 31, 32 and thus effect proper positioning of extension members 33 with respect to said springs and alignment of the surface of members 33 with the seating surfaces of springs 31, 32. Each member 33 includes at its front end an integral curved wire extension 38 coupled with the front loops of springs 31, 32 respectively and with the front loops of springs 8 adjacent to springs 31, 32, the clips 39 being used for this purpose. The rear portion of each member 33 is attached to an edge wire 41 coupled with members 33 and the front coils of the springs by means of clips 42.

Back frame portion 4 of frame structure 2 includes two symmetrically arranged tubular upright posts 43, each of which has its lower end angularly bent to provide forwardly extended supporting arms 44 adapted to support the seat structure by customary adjustment and supporting means (not shown) which readily may be connected to said arms. The upright posts 43 are rigidly secured to the rear rail 6 of the seat frame 3 by means of U-shaped brackets 45 and the forwardly extended supporting arms 44 of said posts are rigidly attached to the front rail 7 of frame 3. Bracket members 45, which preferably are welded to the rear rail 6, have arranged in their flanges 46 round holes 47 for the posts 43. A tubular top rail 48, which is mounted on the upper ends of posts 43, has its ends secured to side rails 49. These side rails which are attached to the side rails 5, 5' of the seat frame portion embody curved rearwardly and laterally extended end portions 50 to bring said side rails into alignment with the top rail 48.

The described back seat frame has substantially U-shaped outline formed by side rails 49 and top rail 48 and its open bottom portion is closed by an individual bottom rail 51. This rail is mounted on upright posts 43 a short distance above the rear rail 7 of the seat frame 3 and thus provides a space or slot 52 between said two rails to be used for a purpose later to be described. Bottom rail 51 is attached to the upright posts 43 in a manner similar to the described connection between rear rail 7 and the posts 43 by brackets 53, which brackets are of similar construction as the bracket members 45 previously described.

Back seat frame 4 is bridged by a plurality of elongated corrugated springs 54, which springs are preferably arranged in alignment with the springs 8 of the seat frame portion. Springs 54 which are substantially of the same construction as springs 8 previously described but preferably made of different gage wire, are rigidly secured to the top and bottom rails 48 and 51 by means of hook-shaped ends 55, 55' and hingedly connected with each other by V-shaped wire hooks 56, which interconnect the springs 54 to a unitary spring structure. The end springs 57, 57' of this spring structure are yieldingly connected with side rails 49 by means of triangularly shaped flat spring members 58, which members are constructed similar to the spring members 26, therefore further description of member 58 is deemed to be superfluous. The tension of spring members 58 partly controls the yielding action of the spring structure and thus permits of such yielding action being readily and easily controlled by a plurality of tension members 58 which differentiate in tension.

It should be noted that springs 54 are secured to the top rail 48 of the back seat frame in such a way that their substantially straight resting portions 59 extend forwardly of the back seat frame and that springs 54 must be downwardly bent and longitudinally stretched before these springs can be attached to the bottom rail 51 of the said back seat frame. This arrangement permits of the springs 54 being shaped to a form embodying a curved portion 60 at their top ends and substantially straight portions 61 at their lower portions. The described differential shape of springs 54 and the spring back structure formed thereby is more readily obtained with a proper tension of the individual spring members 58, therefore substantial consideration must be given to the tension of these spring members.

The assembled unitary spring seat structure is covered with padded coverings, there being a padded covering 62 for the seat portion and a padded covering 63 for the back portion. Padded covering 62 embodies a padded seat portion 64, the padding material 65 of which is arranged between a cover 66 and a lining 67, and such padding material is sewn to said cover and lining by seams 68. Seat portion 64 has attached to its front and side edges a side covering 69 and to its rear edge a fastening strip 70, which latter strip is preferably formed by extending lining 67 rearwardly. In assembly proceedings the padded covering 62 is placed on the seat portion of the spring structure and strip 70 is rearwardly extended through slot 52 between rear rail 7 and bottom rail 51 and then the ends of the front and side coverings are carried around front and side rails 6 and 5, 5' and, at the front, hooked over the rearwardly extended doubled-back portions 17 of hook-shaped means 16 on springs 8. To facilitate these operations a wire 71 is secured to the ends of the front covering which can more readily be hooked over doubled back portion 17 and affords a better tension over the entire length of the covering. The ends of the side covering 71 are preferably fastened to the side rails 5, 5' by means of nailing strips, not shown, or may be secured thereto in any other suitable way.

The padded covering 63 for the back portion of the spring seat structure embodies a padded front portion 72 sewn to the top and side edges of said front portion so as to provide a bag-like covering, the front portion of which is padded with a padding material 74 arranged between and sewn to a cover 75 and its lining 76. In assembly proceedings this covering 63 is pulled over the back portion of the spring structure and then the lower end of its front portion 72 is rearwardly extended through slot 52. As stated above, strip 70 of covering 62 has been previously extended through the slot 52 and now both, strip 70 and the free end of front portion 72 are jointly carried around rear rail 6, and fastened by hooking their ends over the extended hook-shaped portions 21 of springs 8, straight wires 77 and 78 secured to the ends of the strip 70 and front portion 72 being used to facilitate their fastening. The assembly proceedings are finally finished by carrying the end of the back portion 73 around the rear rail 6 and fastening said end to hook-shaped portions 30 in the same manner, a wire 79 being used for this purpose.

It is to be understood that, while we have herein described and illustrated one preferred form of our invention, the invention is not and should not be limited to the precise construction described above but includes within its scope whatever changes fairly come within the spirit of the appended claims.

Having thus described our invention, what we claim is:

1. In a seat structure a tubular frame having pairs of perforations in its wall, a plurality of elongated wire springs bridging said frame, coils at the opposite ends of each of said springs arranged substantially rectangular to the axis thereof and hook-shaped means on the ends of said coils rearwardly extended therefrom and spaced a definite distance from said coils, each hook-shaped means having its free end portion protruded through a pair of said perforations and each coil yieldingly holding the free end of its hook-shaped means from dislodging from said pair of perforations.

2. A wire spring for seat structures comprising a horizontally corrugated seating portion, an integral yielding V-shaped lever arm extending from the front end of said seating portion, an integral coil at the end of said V-shaped lever arm, an integral coil extending downwardly from the rear end of said seating portion, and integral hook-shaped means extending from the ends of said coils, said hook-shaped means having their bent portions spaced a definite distance from said coils for yielding locking action of said coils when said hook-shaped means are secured to the opposite rails of a frame structure.

3. In a seat structure a frame comprising a substantially rectangular seat frame having front, back and side rails, the side rails being bent upwardly near their rear ends, a U-shaped back frame having its sides secured to said side rails and bent at their upper portions on sweeping curves backwardly and inwardly to set the top portion of said U-shaped frame backward with respect to said sides, symmetrically arranged supporting posts for said U-shaped back frame secured to the upwardly bent part of said seat frame and provided with forwardly extended arms secured to the front rail of said seat frame, and a tubular member secured to said supporting posts in slightly spaced relation above the rear rails of said seat frame.

4. A seat structure as described in claim 3, wherein the front and rear rails of said seat frame, the top of said U-shaped back frame and the tubular member secured to said supporting posts are provided with perforations, and wherein corrugated wire springs are rigidly secured at their opposite ends to said rails and back frame members by means of said perforations for crosswise bridging said seat frame and said back frame by said springs.

5. In an automobile seat structure a seat frame, a back frame embodying a U-shaped portion forming the top and side rails of said frame and an independently supported bottom rail arranged substantially parallel to the top rail in rearwardly offset relation with respect to said side rails, a plurality of elongated, corrugated wire springs secured to said top and bottom rails, means hingedly interconnecting said springs with each other to form a substantially unitary surface, and tensioning means ringedly connected with the springs at the opposite sides of said surface and hingedly connected with the said side rails.

6. In an automobile seat structure a back frame embodying a U-shaped portion forming the top and side rails of said frame and a bottom rail mounted independently of said side rails in rearwardly offset relation with respect thereto, a plurality of elongated, corrugated wire springs bridging said frame in a plane through said side rails, means hingedly interconnecting said springs with each other to form a substantially unitary surface and yielding tensioning means between the opposite sides of said surface and the said side rails.

7. In an automobile seat structure a back frame embodying a U-shaped portion forming the top and side rails of said frame and a bottom rail mounted independently of said side rails in rearwardly offset relation with respect thereto, a plurality of elongated, corrugated wire springs embodying V-shaped supporting arms at their lower end secured to said top rail and having their supporting arms secured to the bottom rail, so as to bridge said frame in a plane through said side rails, means hingedly interconnecting said springs with each other to form a substantially unitary surface, and yielding tensioning means between the opposite sides of said surface and the said side rails.

8. An automobile seat structure such as described in claim 7, wherein the upper ends of said springs and the ends of said V-shaped supporting arms are provided with means for releasably attaching said spring to the top and bottom rails and mounting said springs on three point supports on said frame.

9. An automobile seat structure such as described in claim 7, wherein the upper ends of said springs and the ends of said V-shaped supporting arms each are provided with a coil and a hook-shaped means extending from said coil and laterally offset with respect to the axis of the respective spring for removably attaching said springs to said frame and mounting said springs on three point supports on said frame.

10. In an automobile seat structure a back frame embodying a U-shaped portion forming the top and side rails of said frame and a bottom rail arranged substantially parallel to said top rail and rearwardly offset with respect to said side rails, a plurality of elongated, corrugated wire springs secured to said top and bottom rails, V-shaped wire hook members hingedly interconnecting said springs with each other to form a substantially unitary surface, and flat spring means of substantially triangular shape between the opposite sides of said surface and the said side rails.

11. In an automobile seat structure a back frame embodying a U-shaped portion forming the top and side rails of siad frame and a bottom rail arranged substantially parallel to the top rail and rearwardly offset with respect to said side rails, a plurality of elongated, corrugated wire springs secured to said top and bottom rails, means hingedly interconnecting said springs with each other to form a substantially unitary surface, and a plurality of individual tensioning means connecting said side rails with the springs at the side of said unitary surface, said tensioning means having different elasticities to give said unitary surface the desired shape and yielding resistance.

12. In a seat structure a frame, a plurality of elongated wire springs bridging said frame, means on the ends of said springs for securing said springs to said frame and a covering for said wire springs, said means including end portions protruding through said frame and said covering being fastened to the protruding ends of said means.

13. In a seat structure a frame having front, rear and side rails, a plurality of elongated wire springs bridging said frame, hook-shaped means on the ends of said springs for securing said springs to the front and rear rails of said frame and a covering for said wire springs, said hook-shaped means having their ends inwardly extended into said frame beyond said rails and said covering being fastened to the extended ends of said hook-shaped means.

14. In an automobile seat structure a tubular frame having perforations in its rails, elongated, corrugated wire springs bridging said frame, hook-shaped means on the ends of said springs for securing said springs by means of said perforations to said frame, and a covering for said wire springs, said hook-shaped means having their ends protruding through said perforations and said covering being fastened to the protruding ends of said hook-shaped means.

15. In an automobile seat structure a frame having perforations in its rails, elongated, corrugated wire springs bridging said frame, hook-shaped means on the ends of said springs for securing said springs by means of said perforations to said frame, and a covering for said springs, said hook-shaped means having their ends protruding through said perforations and said covering having means attached to its edge for securing said edge to the protruding ends of said hook-shaped means.

16. In an automobile seat structure a frame structure embodying a seat frame and a back frame connected to each other in such a fashion that the rear rail of said seat frame and the bottom rail of said back frame are arranged above and in spaced relation with respect to each other, elongated, corrugated wire springs for bridging said seat frame, elongated, corrugated wire springs for bridging said back frame, hook-shaped means on the ends of all of said springs, a covering for the seat frame having its rear end extended through the slot between said rear rail and bottom rail, and a sleeve-like covering for the back frame having its lower front edge extended through said slot, said rear end of said seat covering and the lower front and rear edges of said back frame covering being carried around said rear rail and secured to the hook-shaped ends at the rear of said wire springs bridging said seat frame.

17. An automobile seat structure as described in claim 16, wherein the rear rail of said seat frame is perforated, wherein each hook-shaped means on the rear ends of the springs for the seat frame includes an elongated straight end protruded through the perforations of said rail and wherein means are provided on the rear end of said covering for the seat frame and said lower ends of said sleeve-like covering for the back frame adapted to be hooked over the said protruding straight ends for interlocking engagement of said coverings with the said straight ends of said hook-shaped means.

18. In an automobile seat a frame having front and rear rails, elongated, corrugated wire springs bridging said frame, and yielding attachment and supporting means on said springs partly surrounding and yieldingly gripping said front and rear rails for releasably supporting said springs thereupon, said yielding attachment and supporting means each including a coil rectangularly related to and yieldingly contacting the inner wall of the respective rail.

19. In a seat structure a frame embodying front and rear rails, a plurality of elongated wire springs bridging said frame in elevated position with respect thereto, and hook-shaped means at the ends of said springs securing same to the front and rear rails of said frame, said rails including means cooperating with said hook-shaped means in securing same to said rails, and each hook-shaped means including a laterally inclined upper portion arranged to rest on a rail in inclined relation with respect to its axis and a lower portion cooperating with the means on said rail in securing said hook-shaped means to said rail, said lower portion being rectangularly related to said rail.

20. In a seat structure a tubular frame having front and rear rails provided with pairs of aligned perforations arranged in planes rectangularly related to the axes of said rails, a plurality of elongated wire springs bridging said frame, and hook-shaped means integrally extended from the ends of said springs and removably securing said springs to said rails, said hook-shaped means including laterally inclined top portions and vertically spaced straight lower portions laterally inclined with respect to said top portions, said top portions resting on said frame in inclined relation with respect to the axes of its rails and said straight lower portions being each threaded through one pair of perforations to effect support of the hook-shaped means in planes inclined with respect to the axes of said rails.

21. In a seat structure a frame, a plurality of horizontally corrugated wire springs arranged side by side crosswise of said frame, means on said springs and frame for attaching said springs to said frame, means interconnecting said springs to form a seating surface, and horizontally looped means sleeved upon and interengaged with the loops of the end springs of said seating surface, said looped means extending in the plane of the loops of said corrugated springs and effecting stiffening and widening of said end springs.

22. In a seat structure a frame, a plurality of elongated springs having corrugated seating portions, means on the ends of said springs and on said frame for connecting said springs to said frame, means hingedly connecting the corrugated seating portions of said springs to form a seating surface, and horizontally corrugated means having their loops sleeved upon loops of the corrugated portions of the end springs of said seating surface to support said looped means by the loops of said end springs in the plane of the seating surface, said corrugated means effecting stiffening and widening of the seating portions of said end springs.

23. In a seat structure embodying a frame and a plurality of wire springs bridged across the frame and mounted thereon, stiffening lateral extension means for the outer ones of said springs, said means being coupled with the sides of the outer springs of said seat structure and having their end portions directly clamped to the loops of the front portions of the said outer springs of the seat structure, and a U-shaped edge wire clamped to the front ends of the springs of said seat structure and to said stiffening and extension means.

24. A seat structure embodying a frame, and a plurality of wire springs bridged across said frame and mounted thereon, said wire springs being provided with corrugated seating portions and rearwardly and downwardly extended front supporting arms adapted to support said seating portions in elevated position and stretch said seating portions when under load, and corrugated wire means having their loops hooked over the loops of the seating portions of the outer springs of said seat structure to stiffen said outer springs and give the seating surface the desired shape.

25. A wire spring for seat structures comprising a horizontally corrugated seating portion, a rearwardly and downwardly extending yielding lever arm integrally extended from the front end of said seating portion, a coil integrally extending from the rear end of said seating portion, and hook-shaped means extended from the end of said lever arm and from said coil, said hook-shaped means including laterally inclined top portions, and straight lower portions laterally inclined with respect to said top portions, and said top and lower portions being spaced from each other definite distances to effect support of said hook-shaped means on their top and bottom portions when said spring is mounted on a frame.

26. In a seat structure a wire spring having a horizontally corrugated seating portion forming alternately left- and right-handed loops, and means for stiffening and widening the sides of said seating portion, said means embodying a horizontally corrugated wire structure with loops of greater width than the loops of the said seating portion, each loop of said wire structure being sleeved over one of the loops of the seating portion so as to engage the bottom face of said one loop and the top face of loops adjoining said one loop for limiting tilting movement of said wire structure with respect to said seating portion.

27. In a seat structure a wire spring having a horizontally corrugated seating portion with left- and right-handed open loops, and means for stiffening and widening the sides of said seating portion of said spring, said means embodying a horizontally corrugated wire structure with left- and right-handed open loops having struck up portions in their side arms, each loop of said wire structure being sleeved over one of the loops of the corrugated seating portion of the wire spring to engage the bottom face of the side arms of said loop and the top faces of loops adjoining said one loop for limiting movement of said wire structure with respect to said seating portion and laterally extending the seating surface of the spring, the struck up portions of said wire structure engaging the wire of said wire spring to effect alignment of the top faces of said wire spring and wire structure.

28. In an automobile seat structure a seat frame, a back frame having a top rail and side rails, forwardly and downwardly extended from said top rail and connected to said seat frame, a bottom rail for said back frame arranged in rearwardly offset position with respect to said side rails, means rigidly connecting said bottom rail to said seat frame, a plurality of elongated, corrugated wire springs secured to the top and bottom rails, means hingedly interconnecting said springs with each other to form a substantially unitary surface, and tensioning means hingedly connected with the springs at the opposite sides of said surface and hingedly connected with the forwardly extended side rails.

29. In an automobile seat structure a seat frame, a back frame secured to said seat frame, said back frame embodying a U-shaped portion forming the top and side rails of said frame, a bottom rail for said back frame arranged substantially parallel to said top rail in rearwardly offset position with respect to said side rails, means rigidly connecting said bottom rail to said seat frame, a plurality of elongated, corrugated wire springs secured to said top and bottom rails, means hingedly interconnecting said springs with each other to form a substantially unitary surface, and tensioning means hingedly connected with the springs at the opposite sides of said surface and hingedly connected with the said side rails.

30. In a seat structure a frame comprising an open tubular seat frame having front, back and side rails, the side rails being bent upwardly near the rear ends thereof, a U-shaped back frame having its sides secured to the side rails of said seat frame, symmetrically arranged supporting posts secured to the front and back rails of said seat frame, and a tubular member forming the bottom rail of the back frame and secured to and supported by said supporting posts in slightly spaced relation above the rear rail of said seat frame.

31. In a seat structure an open frame having front and rear rails, a plurality of elongated wire springs bridging said frame and secured to its rails, means on the ends of said springs securing said springs to said rails, said means including portions extended beyond the inner faces of said rails, and a covering for said wire springs including means carried around said rails and attached to the extended portions of said springs.

32. The combination of an elongated wire spring having at one end an integral coil and an integral hook-shaped attachment means extending from said coil and provided with a straight end laterally offset with respect to said coil, with an elongated, rectangularly perforated supporting member mounting said spring, the straight end of said attachment means being laterally offset with respect to said coil to permit of said end being threaded into the perforation of said attachment means when said spring is slightly rotated, and said attachment means being spaced from said coil a definite distance to effect yielding locking of said attachment means by said coil when said attachment means is secured to said supporting member.

JACOB KRONHEIM.
WILLIAM H. NEELY.